Dec. 8, 1953     D. D. SPEER     2,661,886
ENGINE FUEL TANK FILLER
Filed Nov. 1, 1950
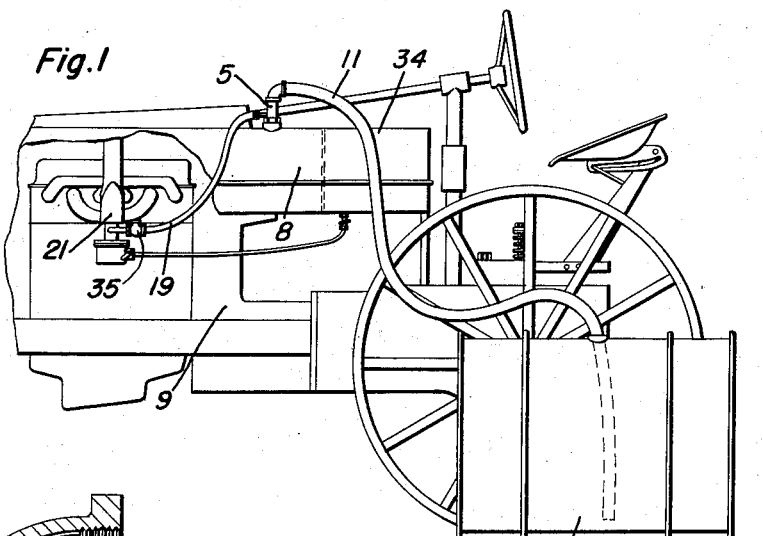
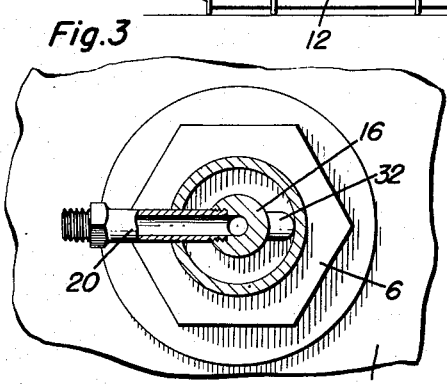
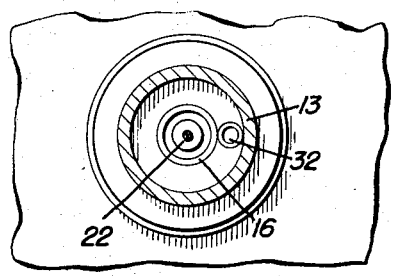
Inventor
Douglas D. Speer
By Clarence A. O'Brien
and Harvey B. Jacobson
Attorneys Patented Dec. 8, 1953

2,661,886

UNITED STATES PATENT OFFICE 2,661,886

ENGINE FUEL TANK FILLER

Douglas D. Speer, Marysville, Wash.

Application November 1, 1950, Serial No. 193,427

3 Claims. (Cl. 226—116)

The present invention relates to new and useful improvements in devices for filling the fuel tanks of tractors and other motor vehicles from a drum or reservoir below the level of the fuel tank.

An important object of the invention is to provide means for filling the fuel tank of a tractor in the field and thus avoiding the usual delay of running the tractor to a central filling pump and then returning the tractor to the field.

A further object of the invention is to provide a vacuum-operated fuel tank filling attachment connected to the intake manifold of the engine for pumping fuel from a drum on the ground into the fuel tank of the tractor.

A still further object is to provide float-operated means for cutting off the vacuum line when the fuel in the fuel tank reaches a predetermined level.

A still further object is to provide a device of this character of simple and practical construction, which is efficient and reliable in operation, relatively inexpensive to manufacture, easy to install in operative position on the tractor and which is otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view;

Figure 2 is an enlarged vertical sectional view of the filler connection for the fuel tank and showing the float-controlled cutoff valve for the vacuum line; and Figures 3 and 4 are transverse sectional views taken respectively on the lines 3—3 and 4—4 of Figure 2.

Referring now to the drawing in detail wherein, for the purpose of illustration, I have disclosed a preferred embodiment of the invention, the numeral 5 designates a fitting having an externally threaded flanged portion 6 for threading in the filling opening 7 of a fuel tank 8 of a farm tractor 9. The upper end of the fitting 5 is threaded for connecting a filling hose 11 thereto, leading from a drum 12 resting on the ground at one side of the tractor.

A tube 13 extends downwardly into the fuel tank 8 from the threaded connecting portion 6 of the fitting, one side of the tube 13 at its upper portion being formed with an opening 14.

The tube 13, below the opening 14, is closed by a plate 15 and to which is suitably secured a vertical tubular valve housing 16 with the lower end of the housing projecting downwardly through plate 15 into tube 13.

The upper portion of valve housing 16 is formed with a valve seat 17 leading to a vertical passage 18 to which a vacuum hose or line 19 is attached by means of a fitting 20, the vacuum line 19 being suitably connected to the intake manifold 21 of the engine of the tractor.

A conical valve 22 is positioned in valve housing 19 for engaging seat 17, the valve having a rod 23 extending downwardly therefrom into tube 13 and with an upper float 24 suitably secured to the lower end of rod 23. A transverse pin 25 suitably secured in the lower portion of tube 13 limits lowering movement of float 24.

A disk 26 is secured to the bottom of float 24 to project outwardly from the sides thereof and with which the upper end 27 of a pivoted catch 28 is engaged, the catch being pivoted adjacent its lower end on a pin 29 suitably secured internally of tube 13, the upper end of the catch being swingable outwardly through an opening 30 in the side of tube 13.

The upper end 27 of catch 28 is held in an outwardly inclined position and the lower end of catch 28 is soldered to a lower float 31 also positioned in tube 13 under float 24, the lower float 31 holding the upper end of catch 27 inwardly in engagement with disk 26 at the bottom of float 24 to hold the upper float 24 from rising prematurely to close valve 22.

A vertical tube 23 is positioned in the upper portion of tube 13 with the upper end of tube 32 connected to valve housing 16 beneath the valve seat 17, the lower end of tube 32 extending through plate 15 adjacent an opening 33 in one side of tube 13.

In the operation of the device, fitting 5 is threaded into the filling opening 7 of a fuel tank 8 and filling hose 11 connected to the top 10 of the fitting and leading to a supply drum 12. The fitting 20 at the upper end of valve housing 16 is then connected to the intake manifold 21 of the engine by the vacuum hose or line 19.

The carburetor of the engine is connected to the auxiliary fuel tank 34, with which the tractor is usually equipped, and the engine started to evacuate air from fuel tank 8 by way of opening 33, tube 32, valve housing 16 and vacuum tube 19, to thus draw fuel from drum 12 through hose 11 into fitting 5 and out through opening 14 into tank 8.

The upper float 24 is held from raising movement, due to vacuum created in tube 13, by catch 27 which is held engaged with disk 26 of float 24 by lower float 31, to thus keep valve 22 open.

As the level in tank 8 rises, lower float 31 is initially raised to release catch 27 and upper float 24 is then permitted to raise for closing valve 22 to cut off the vacuum and the pumping action ceases.

A check valve 35 is provided in vacuum line 19 to prevent danger of backfire from the engine.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A tank filler comprising a fitting for attaching a filling hose to a tank filling opening, said fitting extending downwardly into the tank and having an opening in one side of its inner end, a partition in the inner end of the fitting below said opening to divert liquid entering the fitting outwardly through the opening in the tank, a valve housing in the fitting having an open lower end below the partition, a valve seat in the valve housing, means for attaching a suction line to the valve housing above the valve seat, an air passage leading from the upper portion of the tank to the valve housing below the valve seat for evacuating air from the tank, a float-controlled valve in the housing for closing the valve seat and including a float, a catch holding the float in a lowered position, and a second float locking the catch in engagement with the first float.

2. A tank filler comprising a fitting for attaching a filling hose to a tank filling opening, said fitting extending downwardly into the tank and having an opening in one side of its inner end, a partition in the inner end of the fitting below said opening to divert liquid entering the fitting outwardly through the opening in the tank, a valve housing in the fitting having an open lower end below the partition, a valve seat in the valve housing, means for attaching a suction line to the valve housing above the valve seat, an air passage leading from the upper portion of the tank to the valve housing below the valve seat for evacuating air from the tank, a float-controlled valve in the housing for closing the valve seat and including a float, a catch holding the float in a lowered position, and a second float locking the catch in engagement with the first float, both of said floats being housed in the fitting.

3. A tank filler comprising a fitting for attaching a filling hose to a tank filling opening, said fitting extending downwardly into the tank and having an opening in one side of its inner end, a partition in the inner end of the fitting below said opening to divert liquid entering the fitting outwardly through the opening in the tank, a valve housing in the fitting having an open lower end below the partition, a valve seat in the valve housing, means for attaching a suction line to the valve housing above the valve seat, an air passage leading from the upper portion of the tank to the valve housing below the valve seat for evacuating air from the tank, a valve in the housing for closing the valve seat, an upper float attached to the valve, a catch holding the upper float in a lowered position to maintain the valve open, and a lower float locking the catch in engagement with the upper float.

DOUGLAS D. SPEER.

References Cited in the file of this patent

UNITED STATES PATENTS

| Number | Name | Date |
|---|---|---|
| 1,443,977 | Carr | Feb. 6, 1923 |
| 1,913,078 | Hays | June 6, 1933 |
| 2,325,274 | Pye | July 27, 1943 |